United States Patent [19]

Engels et al.

[11] Patent Number: 5,124,408
[45] Date of Patent: Jun. 23, 1992

[54] RUBBER MIXTURES CONTAINING SULFUR-MODIFIED POLYCHLOROPRENE GEL

[75] Inventors: Hans-Wilhelm Engels, Kerpen; Ulrich Eisele, Leverkusen; Werner Obrecht, Moers; Peter Wendling, Leverkusen; Bernd Stollfuss, Bergisch Gladbach, all of Fed. Rep. of Germany

[73] Assignee: Bayer AG, Leverkusen, Fed. Rep. of Germany

[21] Appl. No.: 535,569

[22] Filed: Jun. 11, 1990

[30] Foreign Application Priority Data

Jun. 24, 1989 [DE] Fed. Rep. of Germany ....... 3920745

[51] Int. Cl.$^5$ .............................................. C08L 11/00
[52] U.S. Cl. ................................................... 525/215
[58] Field of Search ......................................... 525/215

[56] References Cited

U.S. PATENT DOCUMENTS

| 4,433,106 | 2/1984 | Musch | 525/215 |
| 4,737,528 | 4/1988 | Mush et al. | 525/215 |
| 4,895,906 | 1/1990 | Wendling | 525/215 |

FOREIGN PATENT DOCUMENTS

| .0173834 | 3/1986 | European Pat. Off. . | |
| 0222288 | 5/1987 | European Pat. Off. . | |
| 0056439 | 9/1982 | Japan | 525/215 |

Primary Examiner—Paul R. Michl
Assistant Examiner—Olga Asinovsky
Attorney, Agent, or Firm—Connolly and Hutz

[57] ABSTRACT

Rubber mixtures containing so-called "pre-crosslinked" polychloroprene give vulcanizates having an improved combination of low rolling resistance and low abrasion.

10 Claims, No Drawings

RUBBER MIXTURES CONTAINING SULFUR-MODIFIED POLYCHLOROPRENE GEL

This invention relates to a process for the production of mixtures of rubber containing C=C double bonds and sulfur-modified polychloroprene gel, to the mixtures themselves and to vulcanizates produced therefrom. The vulcanizates show reduced hysteresis losses.

In rubber technology, a hysteresis loss is understood to be the energy loss which is irreversibly converted into heat through dynamic stressing of the elastomer. Hysteresis losses are measured as the tan $\delta$ which is defined as the ratio of loss modulus to storage modulus; cf. for example also DIN 53 513, DIN 53 535. Any reduction in the tan $\delta$ in the applicationally important temperature/frequency or amplitude range results for example in reduced heat build-up in the elastomer. Tire treads of rubber vulcanizate characterized by reduced hysteresis loss are distinguished by reduced rolling resistance and, hence, by lower fuel consumption of the vehicles fitted therewith.

Despite the large number of available rubbers, the attention of experts has been directed above all to natural rubber (NR), cis-polybutadiene (BR) and styrene/butadiene copolymers (SBR) for the production of vehicle tires. These rubbers or their mixtures are used worldwide in tire manufacture.

In order to reduce energy costs, the effect of the rubbers used for tire treads on the rolling resistance of the tire has been investigated; H. J. Barager, L. R. Mayo, "Compositions of Neoprene for Low Rolling Resistance Treads" in Rubber Division Symposia Vol. I, 122nd meeting of the Rubber Division Amer. Chem. Soc., Chicago/Ill. Oct. 5th–7th, 1982. According to this Article, tire treads of vulcanized polychloroprene show lower rolling resistance than conventional tire treads, but inadequate abrasion resistance. Although abrasion resistance is improved by blending the pure polychloroprene mixtures with NR, SBR or BR, the level reached still does not correspond to present-day tire treads. In addition, a considerable proportion of the hysteresis gains obtainable by pure CR elastomers is lost in the blends.

Accordingly, the problem addressed by the present invention was to provide rubbers which could be processed to vulcanizates having an improved combination of
1. low rolling resistance—expressed as the lowest possible hysteresis loss (tan $\delta$)—and
2. low abrasion.

It has now surprisingly been found that rubber mixtures containing so-called "pre-crosslinked" polychloroprene satisfy these requirements.

The present invention relates to mixtures of
A. polychloroprene and
B. another rubber containing C=C double bonds, the quantity of polychloroprene A, based on the sum of components A+B, being from 1 to 40% by weight, preferably from 3 to 30% by weight and more preferably from 5 to 20% by weight, characterized in that, again based on the sum of components A+B, 1 to 20% by weight, preferably 3 to 15% by weight and more preferably 5 to 12% by weight of the polychloroprene is sulfur-modified and crosslinked.

The discrepancy between the quantities of polychloroprene in the preamble and in the characterizing part of the above definition takes into account the fact that the polychloroprene does not have to be entirely present as gel. In the present context, the term "gel" means the percentage of the insoluble component as determined by extraction with toluene: 150 mg polychloroprene are left standing in 20 ml toluene for 16 hours and then shaken for 2 hours. The insoluble component is centrifuged off, dried at 70° C. and weighed.

The swelling index ($Q_i$) of the gel is between 5 and 90 and preferably between 10 and 60 and is calculated from the content of toluene ($m_t$) remaining in the gel (after centrifugation at 500,000 m/sec$^2$) and the dry weight of the gel ($m_{gel}$):

$$Q_i = \frac{m_t}{m_{gel}}$$

Suitable polychloroprenes A are chloroprene polymers which, in addition to polymerized 2-chloroprene units, may contain up to 30% by weight and preferably up to 20% by weight, based on chloroprene polymer, of copolymerized units of other ethylenically unsaturated monomers, i.e. polychloroprenes of the type described, for example, in "Methoden der Organischen Chemie" (Houben-Weyl), Vol. E20/2, 842–859, Georg Thieme Verlag, Stuttgart - New York, 1987.

They generally have Mooney viscosities (according to DIN 53 523) in the range from 5 to 140 and preferably in the range from 10 to 120 (ML 1+4)/100° C. and glass transition temperatures below 0° C. and preferably below −25° C.

The quantity of elemental sulfur used for the production of sulfur-modified polychloroprene is from 0.05 to 2.5% by weight and preferably from 0.1 to 1% by weight, based on the monomers used.

Preferred ethylenically unsaturated "other monomers" copolymerizable with chloroprene include compounds containing 3 to 12 carbon atoms and 1 or 2 copolymerizable C=C double bonds per molecule. Examples of preferred "other monomers" are styrene, 2,3-dichlorobutadiene, 1-chlorobutadiene, butadiene, isoprene, acrylic acid, methacrylic acid, acrylonitrile and methacrylonitrile. The most important comonomers are 2,3-dichlorobutadiene and 1-chlorobutadiene.

Particularly preferred polychloroprenes A are free from copolymerized units of "other" ethylenically unsaturated monomers.

The polychloroprenes A may be produced by methods known per se, for example by emulsion polymerization at 0° to 70° C. and preferably at 5 to 50° C.

Crosslinked polychloroprenes may be produced by polymerization to high conversions or—in the case of the monomer inflow process—by polymerization at high internal conversions (DE-AS 1 248 91). The polychloroprenes may also be crosslinked by copolymerization of crosslinking multifunctional compounds having a crosslinking effect. Preferred crosslinking multifunctional comonomers are compounds containing at least 2 and preferably 2 or 3 copolymerizable C=C double bonds, such as for example diisopropenyl benzene, divinyl benzene, divinyl ether, divinyl sulfone, diallyl phthalate, triallyl cyanurate, triallyl isocyanurate, 1,2-polybutadiene, N,N′-m-phenylene dimaleic imide, triallyl trimellitate and also the acrylates and methacrylates of polyhydric, preferably dihydric to tetrahydric, $C_{2-10}$ alcohols, such as for example ethylene glycol, propane-1,2-diol, propane-1,3-diol, butane-1,4-diol, hexane-1,6-diol, polyethylene glycol containing 2 to 20 and preferably 2 to 4 oxyethylene units, trimethylol ethane and propane, tetramethylol methane. Preferred crosslinking acrylates and methacrylates include ethylene diacrylate and dimethacrylate, propylene diacrylate and dimethacrylate, isobutylene diacrylate and dimethacrylate, butylene diacrylate and dimethacrylate, hexanediol diacrylate and dimethacrylate, di-, tri- and tetraethylene glycol diacrylate and dimethacrylate, trimethylol ethane triacrylate and trimethacrylate, trimethylol propane triacrylate and trimethacrylate, tetramethylol methane tetraacrylate and tetramethacrylate.

Crosslinked polychloroprenes may also be produced simply by polymerization in the absence of regulators.

Crosslinked polychloroprenes are known, for example, from DE-AS 12 29 716, 12 47 666, 17 20 107, U.S. Pat. Nos. 3,147,318, 3,714,296, 3,849,519 and EP-A 222 288.

According to the invention, the gel component of the polychloroprene A must be sulfur-modified whereas, for the toluene-soluble component of the polychloroprene A, this is permitted, but not neccesary. Accordingly, the polychloroprene A may also consist of a mixture of sulfur-modified polychloroprene gel and of sulfur-free toluene-soluble polychloroprene. Sulfur-modified polychloroprenes are known, for example, from DE-OS 1 911 439, 2 018 736, 2 755 074, 3 246 748, DE-PS 2 645 920, EP-A 21 212, 200 857, FR-PS 1 457 004 AND U.S. Pat. Nos. 2,264,713, 3,378,538, 3,397,173 and 3,507,825. Sulfur-modified polychloroprenes containing xanthogenate and/or dithiocarbamate functions are preferred.

Preferred rubbers B contain C=C double bonds corresponding to iodine values of at least 2 and preferably from 5 to 470. The iodine values are generally determined by addition of iodine chloride in glacial acetic acid in accordance with DIN 53 241, Part 1 (Wijs' method). The iodine value defines the amount of iodine in grams which is chemically bound by 100 g substance.

The rubbers B include inter alia EPDM, butyl rubber, nitrile rubber, hydrogenated nitrile rubber, natural rubber, polyisoprene, polybutadiene and styrene/butadiene copolymers (SBR) and also mixtures thereof.

The rubbers B generally have Mooney viscosities (DIN 53 523) of from 10 to 150 and preferably from 25 to 80 (ML 1+4)/100° C.

The abbreviation EPDM stands for ethylene/propylene/diene terpolymers. EPDMs include rubbers in which the ratio by weight of ethylene to propylene groups is from 40:60 to 65:35 and which may contain 1 to 20 C=C double bonds/1,000 carbon atoms. Suitable diene monomers in the EPDM are, for example, conjugated dienes, for example isoprene and 1,3-butadiene, and unconjugated dienes containing 5 to 25 carbon atoms, for example 1,4-pentadiene, 1,4-hexadiene, 1,5-hexadiene, 2,5-dimethyl-1,5-hexadiene and 1,4-octadiene; cyclic dienes, for example cyclopentadiene, cyclohexadiene, cyclooctadiene and dicyclopentadiene; alkylidene and alkenyl norbornenes, for example 5-ethylidene-2-norbornene, 5-butylidene-2-norbornene, 2-methallyl-5-norbornene, 2-isopropenyl-5-norbornene and tricyclodienes.

The unconjugated dienes 1,5-hexadiene, ethylidene norbornene and dicyclopentadiene are preferred. The diene content in the EPDM is preferably from 0.5 to 10% by weight, based on EPDM.

EPDM rubbers of the type in question are described, for example, in DE-OS 2 808 709.

The expression "butyl rubber" in the context of the invention encompasses isobutene copolymers of 95 to 99.5% by weight and preferably 97.5 to 99.5% by weight isobutene and 0.5 to 5% by weight and preferably 0.5 to 2.5% by weight copolymerizable diene, such as for example butadiene, dimethyl butadiene, 1,3-pentadiene, more especially isoprene. On an industrial scale, butyl rubber is produced almost exclusively as isobutene/isoprene copolymer by cationic solution polymerization at low temperatures; cf. for example Kirk-Othmer, Encyclopedia of Chemical Technology, 2nd Ed., Vol. 7, page 688, Interscience Publ., New York-/London/Sydney 1965 and Winnacker-Küchler, Chemische Technologie, 4th Ed., Vol. 6, pages 550-555, Carl Hanser Verlag, München-Wien 1962.

The expression "nitrile rubber" stands for butadiene/acrylonitrile copolymers containing 5 to 60% by weight and preferably 10 to 50% by weight copolymerized acrylonitrile. "Hydrogenated" in this context means that 90 to 98.5% and 35 preferably 95 to 98% of the hydrogenatable C=C double bonds are hydrogenated whereas the C≡N triple bonds of the nitrile groups are not hydrogenated. The hydrogenation of nitrile rubber is known; U.S. Pat. No. 3,700,637, DE-OS 25 39 132, 30 46 008, 30 46 251, 32 27 650, 33 29 974, EP-A 111 412, FR-PS 2 540 503.

Preferred styrene/butadiene copolymers are those containing 18 to 60% by weight and preferably 20 to 50% by weight copolymerized styrene. Solution and emulsion polymers are particularly preferred.

Fillers of any type may of course be added to the rubber mixtures according to the invention. Preferred fillers are carbon blacks. Preferred carbon blacks have surfaces of 35 to 200 m$^2$/g (as determined by the CTAB method). Particularly preferred carbon blacks are SAF, HAF, FEF, ISAF and SRF carbon blacks and mixtures thereof. Mixtures of carbon blacks with silicas (with and without filler activators) and silicas which have particle sizes and surfaces comparable with the carbon blacks are also eminently suitable as fillers. The filler content may vary within wide limits, but is often between 30 and 80 parts by weight filler per 100 parts by weight rubber (A+B).

The mixtures according to the invention may be produced in various ways. Thus, it is of course possible to mix the solid individual components. Units suitable for this purpose are, for example, mixing rolls and internal mixers. Mixing is preferably carried out by combining latices of the individual rubbers. The mixtures according to the invention may be isolated in the usual way by concentration by evaporation, precipitation or low-temperature coagulation (cf. U.S. Pat. No. 2,187,146). The mixtures according to the invention may be directly obtained as rubber/filler formulations by incorporation of fillers in the latex mixtures and subsequent working up. Accordingly, the present invention also relates to a process for the production of the described mixtures by combining the components.

To obtain desired crude mixture or vulcanizate properties, the usual processing aids, plasticizers, antidegradants factices and resins may be added to the mixtures according to the invention.

Suitable crosslinking systems are any of the systems known in rubber technology, such as sulfur crosslinking, peroxide crosslinking, urethane crosslinking, metal oxide crosslinking, resin crosslinking and combinations thereof. Preferred crosslinking systems are dependent on the rubbers B used in the mixtures according to the invention, sulfur crosslinking systems being particularly preferred.

The present invention also relates to the vulcanizates produced from the described mixtures.

EXAMPLES a) Production of the polychloroprene gels I to VI

Polymerization is carried out in a 250 liter stirred reactor in accordance with the following basic formulation (quantities in parts by weight):

| | |
|---|---|
| Monomers | 100 |
| Deionized water (total quantity) | 125 |
| Na salt of disproportionated abietic acid | 5.3 |
| Na salt of the condensation product of naphthalene sulfonic acid and formaldehyde | 0.6 |
| KOH | 0.5 |
| $K_2S_2O_8$ | 0.11 |
| Na salt of anthraquinone sulfonic acid | 0.06 |
| Sulfur | |
| Na dibutyl dithiocarbamate (DBDTC) | see Table 1 |
| Tetraethyl thiuram disulfide (TETD) | |

In a modification of the above formulation, 3.5 parts by weight of the Na salt of disproportionated abietic acid were used for polychloroprene gel II.

The aqueous phase consisting of deionized water, the Na salt of disproportionated abietic acid, the Na salt of methylene-bridged naphthalene sulfonic acid, the Na salt of anthraquinone sulfonic acid and KOH was introduced into the reactor and, after purging with nitrogen, heated to the temperature shown in Table 1.

The nitrogen-purged monomers were then added. The crosslinking agent, ethylene glycol dimethacrylate, was dissolved in the monomer. After the temperature shown in the Table had been adjusted, the sulfur was added in the form of a 50% by weight aqueous dispersion and the DBDTC in the form of a 30% by weight aqueous solution. Polymerization was initiated with a small quantity of a nitrogen-purged, dilute aqueous $K_2S_2O_8$ solution and was maintained by addition of this aqueous nitrogen-purged persulfate solution.

The conversion was followed by gravimetry. After the desired conversion had been reached, the polymerization reaction was stopped with 0.03 part by weight, based on latex, of an aqueous 2.5% by weight solution of diethyl hydroxylamine and the quantity of tetraethyl thiuram disulfide (TETD) shown in the Tables subsequently was added to the latex. The TETD was used in the form of a 25% by weight aqueous emulsion of a toluene solution.

The latex was degassed to approx. 500 ppm residual chloroprene (based on latex).

b) Production of polychloroprene gel VII

Polymerization was carried out in a 20 liter stirred reactor in accordance with the following basic formulation (quantities in parts by weight):

| | |
|---|---|
| Chloroprene | 97 |
| Ethylene glycol dimethacrylate | 3.0 |
| Deionized water | 150 |
| Na salt of disproportionated abietic acid | 3.85 |
| Na salt of the condensation product of naphthalene sulfonic acid and formaldehyde | 0.6 |
| NaOH | 0.3 |
| Sodium pyrophosphate | 0.5 |
| Triisopropanolamine | 0.5 |
| Sulfur | 0.5 |
| $K_2S_2O_8$ | 0.1 |
| Na salt of anthraquinone sulfonic acid | 0.02 |
| Tetraethyl thiuram disulfide (TETD) | 0.7 |
| Na dibutyl dithiocarbamate (DBDTC) | 0.42 |

The aqueous phase consisting of deionized water, the Na salt of disproportionated abietic acid, the Na salt of the condensation product of naphthalene sulfonic acid and formaldehyde, sodium pyrophosphate and triisopropanolamine and the monomer phase consisting of chloroprene and ethylene glycol dimethacrylate and also sulfur (in the form of a 50% aqueous dispersion) were introduced into the reactor and, after purging with nitrogen, heated with stirring to 50° C.

Polymerization was initiated by addition of a small quantity of an activator solution consisting of 0.1 part by 20 weight $K_2S_2O_8$ and 0.02 part by weight of the Na salt of anthraquinone sulfonic acid. During the polymerization reaction, the activator solution was added at such a rate that the desired temperature of 50° C. was not exceeded. The conversion was followed by gravimetry. The polymerization reaction was stopped at a conversion of 79% by addition of 0.1 part by weight phenothiazine and 0.7 part by weight TETD (dissolved in monomers) and the excess monomer was removed to a residual content of approximately 500 ppm (based on latex) by stripping with steam under reduced pressure. 0.42 Part by weight DBDTC in the form of a 30% aqueous solution was added to the degassed latex, followed by peptization for 3 hours at 40° C.

TABLE 1

Production of polychloroprene gels (CR gels) I to VII

| Used in Examples | CR gel | Sulfur | EGDM | DCB | Temp. [°C.] | DBDTC | TETD | Conversion [%] | Gel content [%] | Swelling index in toluene |
|---|---|---|---|---|---|---|---|---|---|---|
| | | [parts by weight] | | | | [parts by weight] | | | | |
| 1–9 | I | 0.5 | 5 | 0 | 30 | 1.0 | 3.0 | 83 | 85.6 | 10 |
| 10 | II | 0.5 | 6.5 | 6 | 30 | 1.0 | 3.0 | 80 | 86.1 | 11 |
| 11 | III | 0.5 | 1 | 0 | 30 | 1.0 | 3.0 | 82 | 24.7 | 60 |
| 12 | IV | 0.5 | 10 | 0 | 30 | 1.0 | 3.0 | 80 | 90.6 | 10 |
| 13 | V | 0.5 | 5 | 0 | 45 | 1.0 | 3.0 | 80 | 82.6 | 12 |
| 14 | VI | 0.3 | 5 | 0 | 30 | 2.0 | 3.5 | 78 | 89.2 | 11 |
| 15 | VII | 0.5 | 3 | 0 | 50 | 0.42 | 0.7 | 79 | 74.8 | 15 |

EGDM = ethylene glycol dimethacrylate; DCB = 2,3-dichlorobutadiene; DBDTC = Na dibutyl dithiocarbamate; TETD = tetraethyl thiuram disulfide Polychloroprene gel VIII is a sulfur-free polychloroprene produced by the process described in DE-OS 3 120 992 (conversion 80%).

Production of the Rubber Mixtures According to the Invention

Components used:

| | | |
|---|---|---|
| ® Buna SL 750, | a product of Hüls AG, Marl; solution SBR containing 18% by weight copolymerized styrene, oil-extended (37.5% by weight oil) | |
| ® Buna EM 1712, | a product of Hüls AG, Marl; emulsion SBR containing 23.5% by weight copolymerized styrene, oil-extended (37.5% by weight oil) | |
| ® Buna EM 1721, | a product of Hüls AG, Marl; emulsion SBR containing 40% by weight copolymerized styrene, oil-extended (37.5% by weight oil) | |
| ® Buna EM 2116, | a product of Hüls AG, Marl; emulsion SBR containing 23.5% by weight copolymerized styrene, latex containing 24% by weight solids | |
| ® Buna CB 22, | a product of Bayer AG; neodymium polybutadiene having a cis-1,4-content of 98% | |
| ® Buna CB 30, | a product of Bayer AG; titanium polybutadiene having a cis-1,4-content of 93%, oil-extended (37.5% by weight oil) | |
| ® Baypren 610, | a product of Bayer AG, gel-free polychloroprene, sulfur-modified | |
| SMR 5, | a product of Standard Malaysian Rubber Producers, natural rubber having a Defo value of 700 | |
| Carbon blacks N 220, N 234, N 339, Corax 3 | products of Degussa, Hanau | |
| Ingralen 450, | a product of R. Fuchs Mineralölwerk, Mannheim; plasticizer oil | |
| ZnO—RS, | a product of Zinkweiß-Forschungsgesellschaft mbH; zinc oxide | |
| ® Vulkanox 4010 NA, | a product of Bayer AG; N-isopropyl-N'-phenyl-p-phenylenediamine (antidegradant) | |
| ® Vulkanox HS, | a product of Bayer AG; 2,2,4-trimethyl-1,2-dihydroquinoline, polymeric (antioxidant) | |
| ® Vulkacit NZ, | a product of Bayer AG; benzothiazyl-2-tert.-butyl sulfenamide (vulcanization accelerator) | |
| ® Antilux 111, | a product of Rhein-Chemie Rheinau, Mannheim; microcrystalline wax | |

Abbreviations used and their meanings:

| Abbreviation | Meaning | Method of determination |
|---|---|---|
| S | Tensile strength (MPa) | DIN 53 504 |
| EB | Elongation at break (%) | DIN 53 504 |
| M 100 | Modulus at 100% elongation (MPa) | DIN 53 504 |
| M 300 | Modulus at 300% elongation (MPa) | DIN 53 504 |
| H 23 | Shore A hardness at 23° C. (%) | DIN 53 505 |
| H 70 | Shore A hardness at 70° C. (%) | DIN 53 505 |
| E 23 | Elasticity at 23° C. | DIN 53 512 |
| E 70 | Elasticity at 70° C. | DIN 53 512 |
| tan δ (2%) | Tangent δ at room temperature, 2% amplitude | IMAS Energy Resolver |
| tan δ (40) | Tangent δ at 40° C. | Roelig |
| tan δ (100) | Tangent δ at 100° C. | DIN 53 513 |
| E' (25) | Storage modulus (25° C.) 2% amplitude (MPa) | IMAS Energy Resolver |
| E" (25) | Loss modulus (25° C.) 2% amplitude (MPa) | |
| SE (60) | Storage modulus (60° C.) (MPa) | Roelig DIN 53 513 |
| VE (60) | Storage modulus (60° C.) (MPa) | |
| LC | Loss compliance | |
| STR | Tear propagation resistance (N) | Internal method (4 mm ring) |
| HBU 1 | Heat build-up after 10 mins (°C.) | Compression flexometer |
| HBU 2 | Heat build-up after 25 mins (°C.) | DIN 53 533 Part 3 |
| ABR 4 | Abrasion on emery paper of 40 thickness | DIN 53 516 |
| ABR 6 | Abrasion on emery paper of 60 thickness | DIN 53 516 |

EXAMPLE 1

(Mixing of the Latices)

Polychloroprene gel I latex was mixed with Buna EM 2116 latex in a ratio by weight of 10:90 (based on rubber solids). 2% by weight aqueous $CaCl_2$ solution (5 g $CaCl_2$ per 100 g solids) were added for precipitation. The precipitated product was separated off and dried in vacuo at 60° C.

EXAMPLE 2

As Example 1; ratio by weight CR/SBR 20:80 (based on rubber solids).

EXAMPLES 3 to 15

(Mixing of the Solid Rubbers)

The polychloroprene gel was precipitated from the corresponding latex by addition of 2% by weight aqueous $CaCl_2$ solution (5 g $CaCl_2$ per 100 g solids) and dried in vacuo at 60° C.

The gels obtained were blended with the diene rubber in a ratio by weight of 10:90 in an internal mixer and then compounded in accordance with the formulation shown below. The sulfur and the accelerator were each added on a roll.

The improvement in the hysteresis properties of the mixtures of Examples 1 and 2 according to the invention is reflected in the vulcanizates produced in accordance with the stated formulation. Reductions in the tan δ of 23 to 46%, improvements in tensile strength and increases in moduli were obtained in relation to the comparison vulcanizate C-1, a vulcanizate of an E-SBR precipitated from ®Buna EM 2116 latex by addition of 5% by weight aqueous $CaCl_2$ solution.

| Example | 1 | 2 | C-1 |
|---|---|---|---|
| Rubber | 100 | 100 | 100 |
| Carbon black Corax 3 | 60 | 60 | 60 |
| Stearic acid | 2 | 2 | 2 |
| Antilux 111 | 1.5 | 1.5 | 1.5 |
| Vulkanox 4010 NA | 2.5 | 2.5 | 2.5 |
| Vulkanox HS | 1.0 | 1.0 | 1.0 |
| ZnO—RS | 5.0 | 5.0 | 5.0 |
| Sulfur | 1.8 | 1.8 | 1.8 |
| Vulkacit NZ | 1.2 | 1.2 | 1.2 |
| S | 29.4 | 24.1 | 23.7 |
| EB | 350 | 200 | 540 |
| M 100 | 4.7 | 8.2 | 2.7 |
| M 300 | 25.5 | — | 12.0 |
| tan δ (40) | 0.118 | 0.105 | 0.154 |
| tan δ (60) | 0.108 | 0.092 | 0.150 |
| tan δ (100) | 0.079 | 0.066 | 0.122 |
| E' (25) | 17.07 | 18.29 | 14.63 |

-continued

| Example | 1 | 2 | C-1 |
|---|---|---|---|
| E" (25) | 4.78 | 4.87 | 4.10 |

Examples 3 and 4 show the properties of vulcanizates of mixtures of solution SBR (in this case, particularly Buna SL 750) and CR gel I.

The improvements in elasticity, heat build-up, tan δ and loss compliance are obtained with improvements in tensile strength and constant abrasion behavior. By varying the quantity of sulfur or filling level, it was possible to obtain comparable storage moduli with the improved hysteresis properties intact. According to the correlation between tire properties, for example skid and rolling resistance, and viscoelastic properties (E, HBU, tan δ, etc.) (for example Y. Saito, Kautschuk & Gummi, Kunstst. 1986, 39, 30), reduced rolling resistance will be obtained where the vulcanizates of Examples 3 and 4 are used as tread compound in tires.

| Example | 3 | 4 | C-2 |
|---|---|---|---|
| Buna SL 750 | 123.8 | 123.8 | 137.5 |
| CR gel I | 10 | 10 | — |
| Carbon black N 220 | 65 | 70 | 70 |
| Stearic acid | 1.0 | 1.0 | 1.0 |
| ZnO—RS | 3.0 | 3.0 | 3.0 |
| Vulkanox 4010 NA | 1.0 | 1.0 | 1.0 |
| Vulkacit NZ | 1.2 | 1.2 | 1.2 |
| Sulfur | 1.5 | 1.5 | 1.8 |
| S | 15.1 | 15.0 | 13.9 |
| EB | 385 | 385 | 447 |
| M 100 | 2.3 | 2.4 | 1.8 |
| M 300 | 12.1 | 12.5 | 9.1 |
| H | 64 | 66 | 62 |
| E 23 | 38 | 36 | 38 |
| E 70 | 54 | 51 | 48 |
| HBU-2 | 27.4 | 30 | 37 |
| tan δ (60) | 0.140 | 0.155 | 0.166 |
| SE 60 | 6.89 | 7.26 | 6.75 |
| VE 60 | 0.97 | 1.12 | 1.13 |
| LC | 0.020 | 0.021 | 0.024 |
| ABR 4 | 110 | 105 | 110 |

Example 5 shows the properties of the mixture of Buna SL 750 and CR gel I in a formulation containing the carbon black N 339. The stiffening effect of the CR gel may be compensated by plasticizer oil (in this case, 6 parts Ingralen 450) and reducing the quantity of sulfur, the advantages in regard to elasticity, heat build-up, tan δ and loss compliance remaining unaffected.

| Example | 5 | C-3 |
|---|---|---|
| Buna SL 750 | 123.8 | 137.5 |
| CR gel I | 10 | — |
| Carbon black N 339 | 65 | 70 |
| ZnO—RS | 3.0 | 3.0 |
| Vulkanox 4010 NA | 1.0 | 1.0 |
| Stearic acid | 1.0 | 1.0 |
| Ingralin 450 | 6 | — |
| Vulkacit NZ | 1.2 | 1.2 |
| Sulfur | 1.5 | 1.8 |
| S | 16.3 | 16.8 |
| EB | 405 | 425 |
| M 100 | 2.2 | 2.1 |
| M 300 | 12.1 | 11.7 |
| H 23 | 62 | 64 |
| H 70 | 60 | 61 |
| E 23 | 41 | 41 |
| E 70 | 55 | 50 |
| HBU-2 | 23.0 | 34.3 |
| tan δ (60) | 0.136 | 0.157 |
| SE 60 | 6.77 | 7.13 |

-continued

| Example | 5 | C-3 |
|---|---|---|
| VE 60 | 0.92 | 1.12 |
| LC | 0.020 | 0.022 |

Example 6 shows that only sulfur-modified CR gels lead to an improvement in hysteresis. Although a stiffening effect is observed in Comparison Example C-4 by the addition of sulfur-free polychloroprene gel VIII, there is no reduction in tan δ.

| Example | 6 | C-4 | C-5 |
|---|---|---|---|
| Buna SL 750 | 123.8 | 123.8 | 137.5 |
| CR gel I | 10.0 | — | — |
| Carbon black N 220 | 70 | 70 | 70 |
| ZnO RS | 3.0 | 3.0 | 3.0 |
| Vulkanox 4010 NA | 1.0 | 1.0 | 1.0 |
| Stearic acid | 1.0 | 1.0 | 1.0 |
| CR gel VIII | — | 10 | — |
| Vulkacit NZ | 1.2 | 1.2 | 1.2 |
| Sulfur | 1.8 | 1.8 | 1.8 |
| S | 22.4 | 22.7 | 22.5 |
| EB | 365 | 475 | 580 |
| M 100 | 3.1 | 2.3 | 1.6 |
| M 300 | 18.1 | 12.4 | 9.0 |
| H 23 | 62 | 62 | 64 |
| tan δ (30) | 0.092 | 0.116 | 0.111 |
| tan δ (70) | 0.080 | 0.108 | 0.107 |
| tan δ (110) | 0.067 | 0.088 | 0.086 |

Example 7 shows the properties of a vulcanizate of a mixture of emulsion SBR (in this case Buna EM 1721) and CR gel I. The improved hysteresis properties are reflected in the increased elasticity at 70° C. and the reduced heat build-up.

| Example | 7 | C-6 |
|---|---|---|
| Buna EM 1721 | 123.8 | 137.5 |
| CR Gel I | 10 | — |
| Stearic acid | 1.0 | 1.0 |
| ZnO—RS | 3.0 | 3.0 |
| Carbon black N 234 | 80 | 80 |
| Ingralen 450 | 7.0 | 7.0 |
| Vulkanox 4010 NA | 1.0 | 1.0 |
| Vulkacit NZ | 1.5 | 1.5 |
| Sulfur | 1.5 | 1.5 |
| S | 16.7 | 19.5 |
| EB | 350 | 530 |
| M 100 | 3.3 | 2.0 |
| M 300 | 15.7 | 10.4 |
| H 70 | 64 | 56 |
| E 23 | 16 | 16 |
| E 70 | 39 | 35 |
| STR | 265 | 265 |
| HBU-2 | 33 | 36 |
| ABR 4 | 215 | 222 |

Example 8 shows the vulcanizate properties of a mixture of Buna EM 1712 and CR gel I. The CR-gel-free reference C-7 is used for comparison. In addition, commercially available, gel-free sulfur-modified polychloroprene was used in C-8. This mixture showed hardly any improvement in elasticity; its abrasion behavior was distinctly poorer than that of mixture 8 according to the invention.

| Example | 8 | C-7 | C-8 |
|---|---|---|---|
| Buna EM 1721 | 123.8 | 137.5 | 123.8 |
| CR | 10 gel I | — | 10 Baypren 610 |
| Stearic acid | 1.0 | 1.0 | 1.0 |
| ZnO—RS | 3.0 | 3.0 | 3.0 |

-continued

| Example | 8 | C-7 | C-8 |
|---|---|---|---|
| N 220 | 70.0 | 70.0 | 70.0 |
| Vulkanox 4010 NA | 1.0 | 1.0 | 1.0 |
| Vulkacit NZ | 1.2 | 1.2 | 1.2 |
| Sulfur | 1.8 | 1.8 | 1.8 |
| S | 15.9 | 18.2 | 17.3 |
| EB | 310 | 510 | 410 |
| M 100 | 2.9 | 1.8 | 2.3 |
| M 300 | — | 9.4 | 12.7 |
| H 23 | 67 | 62 | 66 |
| H 70 | 64 | 57 | 60 |
| E 23 | 30 | 31 | 30 |
| E 70 | 52 | 45 | 47 |
| ABR 4 | 109 | 126 | 136 |
| tan δ | 0.158 | 0.168 | 0.172 |
| HBU-2 | 25 | 30 | 28 |

Example 8.1 shows the result of adding CR gel I to an NR/BR blend (Comparison Example C-8.1) A distinct improvement in the hysteresis properties is obtained for the same abrasion resistance.

| Example | 8.1 | C-8.1 |
|---|---|---|
| NR | 80 | 80 |
| Buna CB 22 | 20 | 20 |
| CR gel I | 10 | — |
| Stearic acid | 2 | 2 |
| ZnO RS | 3 | 3 |
| N 110 | 44 | 44 |
| Vulkanox 4010 NA | 1.5 | 1.5 |
| Vulkanox HS | 1.5 | 1.5 |
| Vulkacit MOZ | 1.5 | 1.5 |
| Sulfur | 1.2 | 1.2 |
| S | 22.5 | 23.5 |
| EB | 465 | 520 |
| M 100 | 2.2 | 2.2 |
| M 300 | 12.5 | 11.6 |
| H 23 | 64 | 65 |
| H 70 | 62 | 60 |
| E 23 | 55 | 47 |
| E 70 | 66 | 58 |
| ABR 4 | 106 | 110 |
| HBU 2 | 18 | 26 |

-continued

| Example | 8.1 | C-8.1 |
|---|---|---|
| tan δ (60) | 0.087 | 0.113 |
| SE 60 | 7.05 | 7.01 |
| VE 60 | 0.61 | 0.77 |
| LC 60 | 0.012 | 0.018 |

Example 9 shows the properties of a vulcanizate based on a mixture consisting of natural rubber, E-SBR, polybutadiene and CR gel I. Compared with the comparison mixture, reductions in the tan δ and loss compliance are obtained for improved abrasion behavior.

| Example | 9 | C-9 |
|---|---|---|
| SMR-5, Defo 700 | 25 | 25 |
| Buna EM 1721 | 68.8 | 68.8 |
| Buna CB 30 | 20.6 | 20.6 |
| CR gel I | 10 | — |
| Buna CB 22 | — | 10 |
| Stearic acid | 1.0 | 1.0 |
| ZnO—RS | 3.0 | 3.0 |
| Carbon black N 220 | 65 | 70 |
| Vulkanox 4010 NA | 1.0 | 1.0 |
| Vulkacit NZ | 0.9 | 0.9 |
| Sulfur | 1.2 | 1.3 |
| S | 19.4 | 19.4 |
| EB | 470 | 725 |
| M 100 | 2.5 | 1.4 |
| M 300 | 12.2 | 6.0 |
| tan δ (60) | 0.192 | 0.207 |
| SE (60) | 7.52 | 5.43 |
| VE (60) | 1.45 | 1.13 |
| LC (60) | 0.031 | 0.037 |
| ABR-6 | 86 | 107 |

Examples 10 to 15 show that CR gels can be widely varied (see Table 1) and that the advantageous vulcanizate properties in regard to elasticity, heat build-up, tan δ and loss compliance are confirmed.

| Example | 10 | 11 | 12 | 13 | 14 | 15 | C-10 |
|---|---|---|---|---|---|---|---|
| Buna SL 750 | 123.8 | 123.8 | 123.8 | 123.8 | 123.8 | 123.8 | 137.5 |
| CR-gel II | 10 | — | — | — | — | — | — |
| CR-gel III | — | 10 | — | — | — | — | — |
| CR-gel IV | — | — | 10 | — | — | — | — |
| CR-gel V | — | — | — | 10 | — | — | — |
| CR-gel VI | — | — | — | — | 10 | — | — |
| CR-gel VII | — | — | — | — | — | 10 | — |
| Stearic acid | 1.0 | 1.0 | 1.0 | 1.0 | 1.0 | 1.0 | 1.0 |
| ZnO—RS | 3.0 | 3.0 | 3.0 | 3.0 | 3.0 | 3.0 | 3.0 |
| Carbon black N 220 | 65 | 65 | 65 | 65 | 65 | 65 | 75 |
| Vulkanox 4010 NA | 1.0 | 1.0 | 1.0 | 1.0 | 1.0 | 1.0 | 1.0 |
| Vulkacit NZ | 1.2 | 1.2 | 1.2 | 1.2 | 1.2 | 1.2 | 1.2 |
| Sulfur | 1.5 | 1.5 | 1.5 | 1.5 | 1.5 | 1.5 | 1.8 |
| S | 17.3 | 17.1 | 16.3 | 17.5 | 17.0 | 17.4 | 18.3 |
| EB | 415 | 385 | 390 | 410 | 420 | 400 | 481 |
| M 100 | 2.3 | 2.3 | 2.3 | 2.2 | 2.3 | 2.3 | 2.0 |
| M 300 | 12.7 | 13.4 | 12.9 | 12.5 | 12.7 | 13.0 | 10.7 |
| H 23 | 65 | 65 | 65 | 64 | 65 | 64 | 64 |
| H 70 | 62 | 62 | 62 | 61 | 62 | 62 | 60 |
| E 23 | 40 | 38 | 40 | 40 | 39 | 40 | 36 |
| E 70 | 52 | 52 | 54 | 54 | 53 | 54 | 48 |
| HBU-2 | 25.7 | 25.4 | 25.5 | 25.9 | 25.8 | 25.4 | 43.2 |
| tan 60 | 0.146 | 0.149 | 0.144 | 0.143 | 0.145 | 0.143 | 0.176 |
| SE 60 | 7.13 | 7.23 | 7.02 | 7.06 | 7.20 | 7.06 | 7.13 |
| VE 60 | 1.04 | 1.08 | 1.02 | 1.02 | 1.04 | 1.01 | 1.26 |
| LC 60 | 0.020 | 0.020 | 0.020 | 0.020 | 0.020 | 0.020 | 0.024 |

We claim:
1. Mixtures of:
   A. polychloroprene and
   B. a rubber containing C═C double bonds, selected from the group consisting of ethylene/propylene/diene terpolymers, butyl rubber, nitrile rubber, natural rubber, polyisoprene, polybutadiene and styrene/butadiene copolymers (SBR), or a mixture thereof, wherein the quantity of polychloroprene A, based on the sum of components A+B, is from 1 to 40% by weight, characterized in that, again based on the sum of components A+B, 1 to 30% by weight of the polychloroprene is sulfur-modified and cross-linked.

2. Mixtures as claimed in claim 1, in which the quantity of polychloroprene A is from 3 to 30% by weight.

3. Mixtures as claimed in claim 1 in which the quantity of polychloroprene A is from 5 to 20% by weight.

4. Mixtures as claimed in claim 1, in which 3 to 15% by weight of the polychloroprene is sulfur-modified and crosslinked.

5. Mixtures as claimed in claim 1, in which 5 to 12% by weight of the polychloroprene is sulfur-modified and crosslinked.

6. Mixtures as claimed in claims 1, in which the rubber B is selected from the group consisting of natural rubber, polyisoprene, polybutadiene, SBR.

7. A process for the production of the mixtures claimed in claim 1 by combining the components in solid form.

8. A process for the production of the mixtures claimed in claim 1 by combining the components in the form of their latices and working up the latices together.

9. Vulcanizates produced from the mixtures claimed in claim 1.

10. Tire treads made from vulcanized mixtures of
A. polychloroprene and
B. a rubber containing C=C double bonds, selected from the group consisting of ethylene/propylene/diene terpolymers, butyl rubber, nitrile rubber, natural rubber, polyisoprene, polybutadiene and styrene/butadiene copolymers (SBR), or a mixture thereof, wherein the quantity of polychloroprene A, based on the sum of components A+B, is from 1 to 40% by weight, characterized in that, again based on the sum of components A+B, 1 to 30% by weight of the polychloroprene is sulfur-modified and cross-linked.

* * * * *